ANGULARLY ADJUSTABLE FOLDED DIPOLE

Filed May 11, 1964

INVENTOR:
Harold F. Rieth
By Smyth, Roston & Pavitt
Attorneys.

United States Patent Office 3,290,689

Patented Dec. 6, 1966

3,290,689

ANGULARLY ADJUSTABLE FOLDED DIPOLE

Harold F. Rieth, Santa Monica, Calif., assignor to Packard-Bell Electronics Corporation, Los Angeles, Calif., a corporation of California Filed May 11, 1964, Ser. No. 366,336
5 Claims. (Cl. 343—803)

This is a continuation-in-part application of Serial No. 51,146 filed August 22, 1960, by Harold F. Rieth for "Rabbit Ear Antenna," now abandoned.

This invention relates to television antennas and, more particularly, to television antennas for indoor use or for use at the immediate receiver location.

Indoor antennas are required in many applications where outdoor antennas cannot be utilized. For example, portable receivers which are moved from one location to another generally utilize indoor antennas. The conventional indoor antenna is referred to as a "rabbit ear" antenna because it comprises two tubular sections forming a V-shaped dipole. Rabbit ear antennas of conventional design are used in black-and-white television receivers as indoor antennas but no indoor antennas have been provided as yet for color television receivers. One reason is that the conventional rabbit ear antenna does not provide high quality television reception for color television receivers, essentially because the radiation impedance of the antenna does not match the characteristic impedance of the transmission line coupling the antenna to the color television receiver or the input impedance of the color television receiver. The input impedance of a color television receiver is 300 ohms whereas the radiation impedance of the conventional rabbit ear antenna is 72 ohms.

The V-shaped structure, however, is considered desirable because it provides for the relatively large resonant length required for television frequencies with horizontal space economy. A purely horizontal dipole is too long for use as an indoor antenna. This space economy feature and the ready adjustability of the conventional rabbit ear antenna have caused its extensive use with black-and-white television receivers. In spite of considerable effort, neither the conventional rabbit ear antenna nor any other antenna has been able to be adapted for use as an indoor antenna with color television receivers.

Another disadvantage of the conventional rabbit ear antennas for color television receivers is that the antennas are rather sharply tuned, of high Q, at the particular frequency corresponding to their resonant lengths. Though larger diameter tubing reduces the Q and broadens the frequency somewhat, the response over the entire television band still varies greatly, and moreover thick tubes are considered to be unattractive for use in the home.

Specific illustrative embodiments of this invention relate to the provision of rabbit ear antennas which retain the V-shape and therefore the horizontal space economy in the home, and yet overcome the disadvantages of prior rabbit ear antennas. In particular, the antenna has both a radiation impedance which can be substantially the same as the input impedance of color television receivers and which provides a broad band response. The matching impedance and the broad response are provided by utilizing a folded dipole V-shape.

The antenna constituting this invention includes two V-shaped parallel dipoles positioned adjacent each other in substantially parallel planes or in the same plane and electrically interconnected at their distal ends to form the folded dipole configuration. The dipole rabbit ear antenna is collapsible and may include braces or cross-pieces in each telescoping sleeve between the parallel elements at intermediate positions along the lengths of the elements. The braces may be made of insulating material. Further, the two halves or arms of the dipole rabbit ear antenna are pivoted in a base at a second end opposite the distal end and are attached to the base at the second end. Complete adjustability with respect to the lengths of the halves of the V-shape as well as the rotation of the entire antenna and the pivoting of the two arms or sections of the antenna are, accordingly, provided. Any unbalance of the receiver input may be matched by providing for different lengths of the two sections of the folded dipole rabbit ear antenna.

The antenna constituting this invention has certain advantages over the prior art including Italian Patent 513,138. For example, each of the V-shaped dipoles in the antenna constituting this invention is pivotable through an angle of approximately 90° and is operative in each pivoted position to provide for the reception of television signals and for the introduction of the television signals to the television receiver. This results in part from the fact that all of the arms forming the dipoles extend to the base, are attached to the base and are pivotable at the base whereas in the Italian patent two of the arms extend to the coupling 16 and are not pivotable at the base and are not attached to the base. In view of this difference, the Italian patent has certain non-operating positions such as that shown in FIGURE 3.

Further advantages and features of this invention will become apparent upon consideration of the following description when read in conjunction with the drawing wherein.

Figures 1, 2, 3:
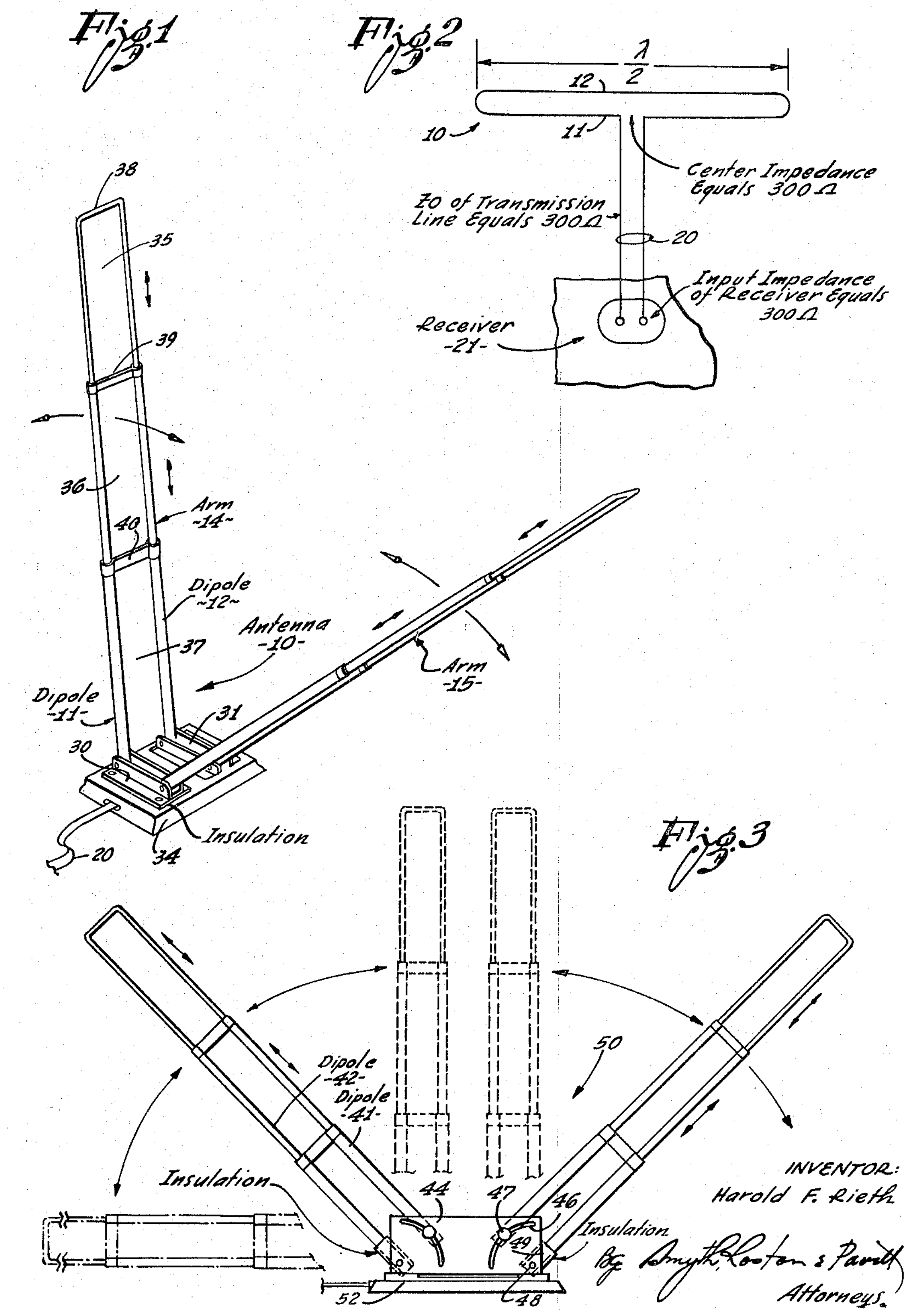
FIGURE 1 is a perspective view of one embodiment of the folded dipole rabbit ear antenna of this invention.
FIGURE 2 is a functional representation of a conventional folded dipole antenna.
FIGURE 3 is a front view of a second embodiment of the folded dipole rabbit ear antenna of this invention.

Referring first to FIGURE 1, the antenna 10 functions essentially as a folded dipole antenna with its resonance not being affected either by the angular bend at the center of the antenna to form the V-shape, or by positioning the parallel halves of the two dipoles 11 and 12 forming the antenna 10 in the same transverse plane, that is not vertically one above the other.

An electromagnetic wave, as employed for television and frequency modulated radio transmission, consists of an electric force acting alternately one way and the opposite in a horizontal direction perpendicular to the direction of propagation of the wave. The electromagnetic wave also includes a magnetic force action in alternate vertical directions. Polarization of a wave refers to the direction of its electric lines of force and, with horizontal electric lines of force, the wave is referred to as being horizontally polarized. Horizontal polarization instead of vertical polarization provides a better ratio of signal to noise because most electrical interference travels with vertical polarization.

A component of the horizontally polarized waves, accordingly, induces current in the angularly positioned sections or arms 14 and 15 of the antenna structure 10. Any current induced, due to a tilt in the polarization in the waves cancels because of the symmetry of the V-shape structure 10.

Due to the reversal of the direction of the electric force at intervals of one-half the wave length of the propagated wave resonance is achieved by utilizing dipoles having a length substantially equal to one-half of the wave length of the signal to be received. Actually, because conductors of finite dimensions are utilized and because of other factors, the physical length of the dipole is usually approximately 90 percent of one-half of the wave length. The following table illustrates antenna dipole lengths for the channels of the conventional television band utilized in the United States:

LENGTHS OF HALF-WAVE ANTENNAS

| Channel Number | Center Freq., mc. | Wave Length in air, Inches | Antenna Length | |
|---|---|---|---|---|
| | | | Feet | Inches |
| 2 | 57 | 207.2 | 7.94 | 95.3 |
| 3 | 63 | 187.5 | 7.18 | 85.2 |
| 4 | 69 | 171.3 | 6.56 | 78.8 |
| 5 | 79 | 149.5 | 5.73 | 68.8 |
| 6 | 85 | 139.0 | 5.32 | 64.0 |
| 7 | 177 | 66.8 | 2.56 | 30.7 |
| 8 | 183 | 64.6 | 2.48 | 29.7 |
| 9 | 189 | 62.5 | 2.40 | 28.8 |
| 10 | 195 | 60.6 | 2.32 | 27.9 |
| 11 | 201 | 58.8 | 2.25 | 27.0 |
| 12 | 207 | 57.1 | 2.18 | 26.6 |
| 13 | 213 | 55.5 | 2.12 | 25.5 |

A particular illustrative overall length for the antenna structure 10 may be 50 inches which is roughly set for the center of the television band. The overall length refers to the sum of the lengths of the two arms 14 and 15. The antenna structure 10 is resonant at about 125 megacycles even though it is bent to form the V-shape instead of being fully horizontally aligned as is the conventional folded dipole structure. The structure 10 moreover, is not critical from a directivity standpoint as it receives substantially maximum radiation for signals in a 30° arc. The maximum diameter of the tubing forming the structure 10 may be ⅜-inch and with such dimensions, a reduced "Q" is provided so that the antenna structure 10 functions substantially as a wide band receiving antenna for the entire frequency band between 54 and 217 megacycles.

The antenna structure 10 includes two parallel elements or dipoles 11 and 12 which have similar diameters at similar positions. When both dipoles 11 and 12 of a folded dipole are of similar diameters and are close together, the input impedance is four times that of a simple dipole, or approximately 300 ohms. The 300 ohm input impedance presented by the folded and bent dipole structure 10 provides for a relatively good impedance match with the input impedance of the conventional black-and-white television receiver and also of color television receivers. The impedance may be changed by changing the diameter or cross-sectional shape of the tubing forming the antenna structure 10. FIGURE 2 is a functional representation of both a conventional folded dipole antenna and of the antenna structure 10. As shown in FIGURE 2, the dipole 11 is separated at its center and the ends of the separated portions are coupled to the twin lead 20. The twin lead 20 is in turn connected to the input terminals of a conventional black-and-white television receiver 21 or of a color television receiver.

By bending the dipoles 11 and 12 at their centers to form the V-shape, the horizontal length of the antenna structure 10 is smaller than the conventional folded dipole. The magnitude of the response is somewhat less but the advantages of the V-shape are compensatory. As shown in FIGURE 1, the arms or halves of the dipole 11 are pivotally mounted at one end in a bracket 30 on a base 34 and the arms or halves of the dipole 12 are pivotally mounted at one end in a bracket 31 on the base 34. The arms of the dipoles 11 and 12 may be pivoted through an angle of approximately 90° between horizontal and vertical positions in FIGURE 2. The arms of the dipole 11 are disposed in relatively closely spaced and substantially parallel relationship to the arms of the dipole 12. The bracket 30 may be made of insulating material and the bracket 31 may be made of conductive material. The bracket 30 accordingly electrically isolates the two halves of the dipole 11 at the base 34 which supports the two brackets 30 and 31.

Each of the halves or arms 14 and 15 may be made of three telescoping sections 35, 36 and 37 to provide for the ready adjustability of the length of the arms. The sections 35, 36 and 37 respectively include the braces or cross-pieces 38, 39 and 40. The brace 38 is made of conductive material and may be integral with the outer ends of the portions of the dipoles 11 and 12 forming the section 35. The brace 38 forms the distal end of the arm and serves to electrically interconnect the dipoles 11 and 12. The braces 39 and 40 may be made of insulating material so as not to electrically short part of the antenna structure. The braces 39 and 40 are at intermediate positions along the lengths of the arms and are at the outer or distal ends of the respective sections 36 and 37 and accordingly do not interfere with the telescoping of the sections one into another.

By providing for a pivotal disposition of all of the arms in the dipoles 11 and 12 on the base 34, the arms can be pivoted through angles up to 90° while still operating to receive television signals and introduce these signals to the television receiver. The arms can also be telescoped to different lengths so as to vary the impedance of the antenna in accordance with the impedance differences between individual television receivers. These features enhance the operation of the antenna constituting this invention with color television receivers since color television receivers have a more critical operation with variations in input impedance from the antenna than black-and-white television receivers.

In FIGURE 3, a second embodiment of the invention is depicted wherein the two dipoles 41 and 42 of an antenna structure 50 are vertically aligned in a common plane instead of being disposed in substantially parallel planes as in FIGURE 1. The two dipoles 41 and 42 are both pivoted on a support bracket 44. By vertically aligning the dipoles, any parasitic effects resulting from effectively horizontally aligned dipoles are avoided. The antenna shown in FIGURE 3 otherwise operates in substantially the same manner as the antenna described above with reference to FIGURE 1. The central ends of the arms of the dipole 41 are each mounted on a pin 47 which rides in an associated arcuate groove 46 of the bracket 44. The bracket 44 and pin 47 may be made of electrically conductive material. The central ends of the arms of the dipole 42 are supported in sleeves 49 which may be made of insulating material to electrically isolate the dipole 42 from the bracket 44 and the two halves of the dipole 42 from each other at the bracket 44. The sleeves 49 may be pivoted on the bracket 44 by pins 48 made of insulating materials. The bracket 44 may be affixed to a base 52 which can be movably placed on top of the television receiver.

In this manner, a completely adjustable antenna both from the standpoint of orientation and size is provided. The antenna may be oriented by rotating it on the TV receiver; it may be adjusted by pivoting its two arms on the base and the length of each of the two arms may be separately adjusted by telescoping the arms. The adjustability features are additional to the features of providing a radiation impedance matching the receiver input impedance and a broad band response and are especially advantageous when used with color television receivers.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A television antenna for use with a television receiver and particularly a color television receiver, including, a first dipole having two arms forming a V-shape and constructed to be telescoped, a second dipole having two arms forming a V-shape and constructed to be telescoped, each arm of the second dipole being disposed in paired relationship to a corresponding arm of the first dipole, each of the arms in the first and second dipoles having first and second opposite ends, a first conductive portion extending between first ones of the paired arms of the first and second dipoles at the first ends of these paired arms, a second conductive portion extending between the other ones of the paired arms of the first and second dipoles at the first ends of these paired arms, a first insulating brace extending between the first ones of the paired arms of the first and second dipoles at an intermediate position between the first and second opposite ends of these arms, a second insulating brace extending between the other ones of the paired arms of the first and second dipoles at an intermediate position between the first and second opposite ends of these arms, means insulating the arms in the first dipole from each other at the second ends of these arms, a pair of leads extending from the arms in the first dipole at the second ends of these arms to provide electrical connections to the television receiver for the introduction of television signals to the receiver, means electrically connecting the arms in the second dipole at the second ends of these arms, a support member operatively coupled to the arms in the second dipole at the second ends of these arms and pivotally supporting the arms of said first and said second dipoles at the second ends of these arms to provide for a pivotal movement of the arms in the first and second dipoles through an angle of appoximately 90° and an operation of the television antenna in any pivotal position of the arms in receiving the television signals and introducing the television signals to the television receiver, the first V-shaped member and the second V-shaped member being in substantially the same plane and the first and second V-shaped members being supported by a bracket and the bracket being provided with slots to provide a pivotal disposition of the first and second V-shaped members relative to the bracket and pins being mounted in the slots and are coupled to the second ends of the arms in the members to provide for a pivotal disposition of the members.

2. A television antenna for use with a television receiver and particularly a color television receiver, including, a base, a first V-shaped member made of electrically conductive material, said first member having two separate arms each having first and second ends and each extending to the base at the first end and each attached to the base and each pivotable on said base at the first end through an angle of approximately 90° to provide for an operation of the antenna in each pivotable disposition of the members in receiving signals and introducing the signals to the television receiver, means electrically connecting the first ends of said two arms at said base, a second V-shaped member made of electrically conductive material, said second member having two separate arms each having first and second ends and each extending to the base at the first end and each attached to the base and each pivotable on said base at the first end through an angle of approximately 90° to provide for an operation of the antenna in each pivotable disposition of the members in receiving signals and introducing the signals to the television receiver, means at said base for electrically insulating the ends of said arms of said second member from each other at said base, a pair of wires connected to the ends of said arms of said second member at said base to provide connections to the television receiver for the introduction of signals to the television receiver, each of said arms of said first and said second members being collapsible at the second ends and having at least two telescoping parts, a brace member made of insulating material for connecting respeetively one telescoping part of each arm of said first member to one telescoping part of each arm of said second member, a first connector made of electrically conductive material and electrically connecting the second end of one of the arms of the first member to the second end of one of the arms of the second member, a second connector made of electrically conductive material and electrically connecting the second end of the other one of the arms of the first member to the second end of the other one of the arms of said second member, the first V-shaped member and the second V-shaped member being in substantially the same plane.

3. A television antenna, including, a first dipole having two arms forming a V-shape and constructed to be telescoped, a second dipole having two arms forming a V-shape and constructed to be telescoped, each arm of the second dipole being disposed in paired relationship to a corresponding arm of the first dipole, the first dipole being in substantially the same plane as the second dipole, a first conductive portion extending between first ones of the paired arms of the first and second dipoles, a second conductive portion extending between the other ones of the paired arms of the first and second dipoles, a first insulating brace extending between the first ones of the paired arms of the first and second dipoles, a second insulating brace extending between the other ones of the paired arms of the first and second dipoles, means insulating the arms in the first dipole from each other, a pair of leads extending from the arms in the first dipole to provide electrical connections to the television receiver for the introduction of television signals to the receiver, means electrically connecting the arms in the second dipole, and a support member pivotally supporting the arms of said first and said second dipoles.

4. A television antenna, including, a first dipole having two arms forming a V-shape and constructed to be telescoped, a second dipole having two arms forming a V-shape and constructed to be telescoped, each arm of the second dipole being disposed in paired relationship to a corresponding arm of the first dipole, the first V-shaped member and the second V-shaped member being in substantially the same plane and the first and second V-shaped members being supported by a bracket and in which the bracket is provided with slots to provide a pivotal disposition of the first and second V-shaped members relative to the bracket, a first conductive portion extending between first ones of the paired arms of the first and second dipoles, a second conductive portion extending between the other ones of the paired arms of the first and second dipoles, the first and second conductive portions being at the ends of the arms in the first and second dipoles opposite to the support member, a first insulating brace extending between the first ones of the paired arms of the first and second dipoles, a second insulating brace extending between the other ones of the paired arms of the first and second dipoles, the first and second insulating braces being at intermediate positions along the lengths of the arms in the first and second dipoles, means insulating the arms in the first dipole from each other, a pair of leads extending from the arms in the first dipole to provide electrical connections to the television receiver for the introduction of television signals to the receiver, means electrically connecting the arms in the second dipole, and a support member pivotally supporting the arms of said first and said second dipoles.

5. A television antenna for use with a television receiver, including, a base, a first V-shaped member made of electrically conductive material, said first member having two separate arms each pivotable on said base and constructed to be telescoped, means electrically connecting said two arms at said base, a second V-shaped member made of electrically conductive material, said second member having two separate arms each pivotable on said base and constructed to be telescoped, the first V-shaped member and the second V-shaped member being in substantially the same place, means electrically insulating the ends of said arms of said second member from each other at said base, a pair of wires connected to the ends of said arms of said second member at said base to provide connections to the television receiver for the introduction of signals to the television receiver, each of said arms of said first and said second members being collapsible and having at least two supporting parts, a brace member made of insulating material for connecting respectively one telescoping part of each arm of said first member to one telescoping part of each arm of said second member, a first connector made of electrically conductive material and electrically connecting one end of one of the arms of the first member to one end of one of the arms of the second member, and a second connector made of electrically conductive material and electrically connecting one end of the other one of the arms of the first member to one end of the other one of the arms of said second member.

References Cited by the Examiner

UNITED STATES PATENTS

| | | | |
|---|---|---|---|
| 2,161,435 | 6/1939 | Smith | 343—851 |
| 2,496,646 | 2/1950 | Winer | 343—803 |
| 2,569,810 | 10/1951 | Hamel et al. | 343—803 |
| 2,620,442 | 12/1952 | Trebules | 343—803 |

FOREIGN PATENTS

| | | |
|---|---|---|
| 673,084 | 6/1952 | Great Britain. |
| 513,138 | 2/1955 | Italy. |

ELI LIEBERMAN, *Primary Examiner.*

HERMAN KARL SAALBACH, *Examiner.*